United States Patent
Ferrari et al.

(10) Patent No.: US 7,716,618 B2
(45) Date of Patent: May 11, 2010

(54) METHOD AND SYSTEM FOR DESIGNING SEMICONDUCTOR CIRCUIT DEVICES TO REDUCE STATIC POWER CONSUMPTION

(75) Inventors: Lina Ferrari, Milan (IT); Francesco Cretti, Milan (IT)

(73) Assignee: STMicroelectronics, S.R.L., Agrate Brianza (MI) (IT)

( * ) Notice: Subject to any disclaimer, the term of this patent is extended or adjusted under 35 U.S.C. 154(b) by 214 days.

(21) Appl. No.: 11/809,783

(22) Filed: May 31, 2007

(65) Prior Publication Data

US 2008/0040698 A1  Feb. 14, 2008

(30) Foreign Application Priority Data

May 31, 2006  (EP) ................................. 06011315

(51) Int. Cl.
*G06F 17/50* (2006.01)
(52) U.S. Cl. ................................. 716/11; 716/2; 716/6
(58) Field of Classification Search .................. None
See application file for complete search history.

(56) References Cited

U.S. PATENT DOCUMENTS

| | | | |
|---|---|---|---|
| 5,774,367 A | 6/1998 | Reyes et al. | |
| 5,880,967 A | 3/1999 | Jyu et al. | |
| 6,209,122 B1 | 3/2001 | Jyu et al. | |
| 6,327,552 B2 | 12/2001 | Nemani et al. | |
| 6,425,115 B1 * | 7/2002 | Risler et al. | 716/17 |
| 6,687,888 B2 | 2/2004 | Chen | |
| 6,711,719 B2 | 3/2004 | Cohn et al. | |
| 6,711,720 B2 | 3/2004 | Chen | |
| 6,798,682 B2 * | 9/2004 | Chuang et al. | 365/63 |
| 6,941,525 B2 * | 9/2005 | Gandhi | 716/1 |
| 7,055,121 B1 | 5/2006 | Bolander et al. | |
| 7,093,208 B2 * | 8/2006 | Williams et al. | 716/3 |
| 7,114,134 B2 * | 9/2006 | Zhang et al. | 716/3 |
| 7,207,022 B2 * | 4/2007 | Okudaira | 716/6 |
| 7,441,211 B1 * | 10/2008 | Gupta et al. | 716/2 |

(Continued)

OTHER PUBLICATIONS

European Search Report, European Patent Office, Oct. 17, 2006, Application No. EP 06 01 1315, 2 pp.
S. Thompson, I. Young, J. Greason, M. Bohr, "Dual Threshold Voltages and Substrate Bias: Keys to High Performance, Low Power, 0.1 μm *Logic* Designs," 1997 Symposium on VLSI Technology Digest of Technical Papers, Jan. 1997, pp. 69-70.

(Continued)

*Primary Examiner*—Leigh Marie Garbowski
(74) *Attorney, Agent, or Firm*—Lisa K. Jorgenson; Paul F. Rusyn; Graybeal Jackson LLP (57) ABSTRACT

A method and system are disclosed for designing a complex integrated electronic circuit architecture including a plurality of circuit portions integrated into a single chip structure. The method includes providing at least one library of cells with a variable channel length L; creating a layout of an integrated circuit using the cells with an initial channel length L; performing a timing analysis of the integrated circuit to analyze more and less critical paths by evaluating respective path delays; selecting a set of less critical paths to be modified; evaluating the leakage currents of the less critical paths of the selected set; and modifying the variable channel length L of the cells which are involved in the less critical paths of the selected set on the basis of the corresponding evaluated leakage current and the respective path delays, whereby a modified integrated circuit with a reduced circuit leakage current is obtained.

19 Claims, 6 Drawing Sheets

U.S. PATENT DOCUMENTS

2004/0105300 A1 6/2004 Chuang et al.
2004/0243946 A1 12/2004 Gandhi
2005/0278660 A1 12/2005 Zhang et al.

OTHER PUBLICATIONS

Synopsys, Inc., "Managing Power in Ultra Deep Submicron ASIC/IC Design," May 2002, whole document (11 pages).

* cited by examiner

METHOD AND SYSTEM FOR DESIGNING SEMICONDUCTOR CIRCUIT DEVICES TO REDUCE STATIC POWER CONSUMPTION

PRIORITY CLAIM

The present application claims the benefit of European Patent Application No. 06011315.6, filed May 31, 2006, which application is incorporated herein by reference in its entirety.

TECHNICAL FIELD

Embodiments of the present invention relate to methods for designing a complex integrated electronic circuit architecture including a plurality of circuit portions integrated into a single chip structure.

More specifically, embodiments of the invention relate to the data processing field and more particularly to a method for implementing a software tool that is specific for the integrated circuit design for reducing the leakage current of a circuit so obtained.

The current trend in CMOS (complementary metal oxide semiconductor) integrated circuit library design, including circuits formed of low VT (threshold voltage) devices and circuits formed of high VT devices, is to reach a strong optimization activity in terms of area, speed and power of the circuits.

However, a decrease in the transistor size corresponds to an increase in the doping level causing leakage currents to become relatively larger. This results in a significant amount of power consumption even if a large part of the device is totally inactive. As a consequence static power consumption is increasing enormously in the newest technologies as transistors shrink in size and today's ICs approach tens of millions of gates. For the above reasons, power consumption due to this leakage current has become a critical issue especially for nanometer technology.

As a consequence, for example, in very high-speed designs, at frequencies approaching 1 GHz and above, the timing closure is the main goal but the related amount of leakage cannot be tolerated anymore. The problem is so relevant that some devices may dissipate a significant fraction of maximum allowed power.

BACKGROUND

Several techniques have been used to address the leakage problem; for instance some techniques propose using only high performance LVT circuits in the critical path and slower circuits, such as HVT device, with less leakage elsewhere on the chip. Circuit libraries are available in several variations of VTs, which can be mixed and matched throughout the chip. Very complex chip methodologies are used to determine where a HVT circuit should be used in place of a Low VT (LVT) circuit to increase performance.

In one prior approach, a method and system for determining optimal delay allocation to data path blocks is based on area-delay and power-delay curves. In particular this method, system and computer program product automatically determine optimal design parameters of a subsystem to meet design constraints. The subsystem includes a plurality of circuits. The optimal design parameters are determined by performing a parameter-delay curve optimization of the subsystem design parameters.

Another solution is, in a standby state, the use of substrate bias to reduce leakage. In functional mode there is no performance degradation. Dual Threshold voltage is a well-known approach to reduce leakage by partitioning the circuit based on the speed/performance requirements.

In connection with such a Dual Threshold Voltages strategy, another approach for power management includes first synthesis step performed using high-Vt transistor, while low-Vt are used to close the timing constraints.

We will make hereinafter more specific reference to the SYNOPSYS tools that are known for reducing power at an average of 10 to 20 percent during gate-level optimization.

Based on user's timing, power and area constraints, these tools measures trade-offs between positive timing slacks, area and power and then deliver the lowest power consuming design that meets timing constraints, while maintaining the area limit when specified by the user. Power Compiler performs automatic clock gating at the Register Transfer Level (RTL) and it also supports multi-threshold libraries for automatic leakage optimization. Incremental synthesis allows starting with all high threshold voltage cells and substituting a small percentage of them with low threshold voltage ones for critical paths. After place and route, the substitution of high $V_t$ cells with low $V_t$ ones after paths are analyzed with precise timing information is implemented.

A further tool does multi-$V_t$ leakage power optimization. Moreover, these tools are capable of minimizing the leakage during the synthesis step through the clock gating approach and, following P&R, the multi-$V_t$ optimization is done.

Another approach proposed by tool vendors is based on the fact that the leakage current of a gate mainly depends on the state of the input signals. If a vector can be found that minimizes the leakage current, then this vector can be applied when the circuit is idle. However, it's quite a hard job to find such an optimal vector as the logic depth increases.

A SIGNOFF static timing analysis (STA) is performed after the place and route of the block. The main issues with this approach are related to critical paths at high frequency, in the range of 1 GHz, where the timing closure is a must despite the power consumption, leakage and area. On the other end, on paths at lower frequencies where the positive slacks are quite large, it is possible to reduce the leakage by slowing down some data delays thus losing timing margin but still maintaining require specifications.

All the known methodologies above described, whilst enabling a decrease of power consumption, nevertheless have a recognized drawback not yet overcome, that the obtained decrease of leakage often affects the ability to achieve or respect the timing requirements.

In view of the above-outlined drawback of the state of the art, there is the need of providing a method and system to implement application specific integrated circuit (ASIC) designs in order to reduce leakage without affecting the timing requirements.

SUMMARY

According to embodiments of the present invention, a method and system selecting, in an integrated circuit, a set of paths which are non-critical for timing constrains and to modify the channel length of the cells involved in such non-critical paths, in order to reduce the leakage of current of the overall integrated circuit.

According to other embodiments of the present invention, a method for designing a complex integrated electronic circuit architecture including a plurality of circuit portions integrated into a single chip structure includes providing at least one library of cells with a variable channel length; creating a layout of an integrated circuit using the cells with an initial channel length L; performing a timing analysis of the integrated circuit to analyze more and less critical paths by evaluating respective path delays; selecting a set of less critical paths to be modified; evaluating the leakage currents of the less critical paths of the selected set; and modifying the variable channel length L of the cells which are involved in less critical paths of the selected set on the basis of the corresponding evaluated leakage current and the respective path delays, whereby a modified integrated circuit with reduced circuit leakage current is obtained.

The step of creating the layout may be performed by means of a place and route software tool.

The first and second steps of timing analysis may be performed by means of respective signoff static timing analysis.

According to one embodiment of the invention, a single-threshold library is used, comprising a high voltage threshold cell library.

It is worthwhile to note that the principle of embodiments of the present invention may be applied even using a different cell library, for example a single-threshold library with standard voltage threshold cell library or low voltage threshold cell library in order to have an higher leakage.

Moreover, multi-threshold voltage libraries may be used, for example including a high voltage threshold cell library and a low voltage threshold cell library, in order to give priority of the timing closure of the block.

According to embodiments of the invention, the step of providing the library is performed by building a timing library including parametric formulas as a function of channel length.

The step of providing the second library may also be performed by building a timing library, comprising a table of channel lengths. Such tables includes, for specific values of channel lengths, corresponding values of the leakage current and respective path delays. In this case, the length of the cells of the second library is selected by the table of channel lengths.

The step of providing the library may be performed by building several timing libraries, each one based on a specific channel length.

According to another embodiment of the present invention, the method provides the designing of the integrated circuit by means of at least a first library of standard cells with predetermined channel length and by replacement of the standard cells involved in non-critical paths with cells belonging to a second library, the channel length L of the cell of said second library being modifiable for reducing the leakage of current.

Advantageously, a set of standard cells may be built-up based on the needed channel lengths. For example, the channel length could span from minimum length to a higher length, for example two times the minimum length. Starting from a basic layout, for example with minimum channel length, a parameter is passed to a layout tool which is used to increase the channel length by some units of grid values.

Advantageously, this method leads to a very simple way to reduce current leakage: a basic library can be designed only once for different implementations, thus obtaining a light database, without the need of several libraries to be swapped depending on the current need.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1A:
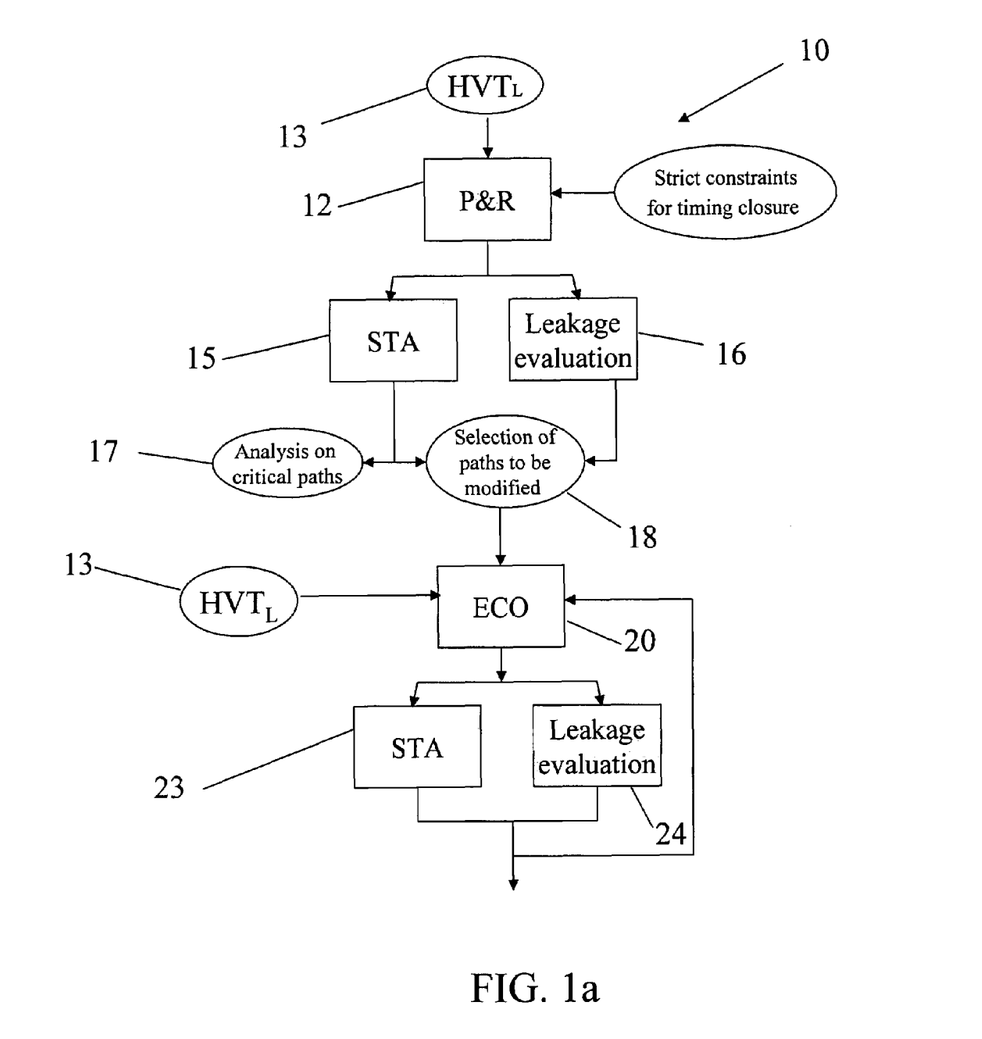
FIG. 1a is a flow chart of an implemented digital design flow according to one embodiment of the present invention.

Referring to FIG. 1a, the main steps of method according to a first embodiment of the present invention are shown in terms of a flow chart. In particular FIG. 1a illustrates a flow diagram showing a general overview of a method 10 to implement application specific integrated circuit (ASIC) designs comprising multi-threshold voltage VT circuits.

More particularly, the following description and the annexed FIG. 1a describe a method for designing complex integrated electronic circuit architecture, and for reducing the corresponding circuit leakage current, through a single-threshold voltage library.

However it is worth noting that methods of embodiments of the invention may be also executed for designing a complex integrated electronic circuit architecture, and for reducing the corresponding circuit leakage current, using a multi-threshold voltage library, for example including a low voltage threshold library having a high leakage and a high voltage threshold library having an low leakage, as schematically represented in FIG. 1a.

The following description of each step of the method generally follows the flow of the overview provided in FIG. 1a.

The following terms are defined for clarity in understanding the following disclosure.

A place & route software tool 12 (P&R in FIG. 1a) is a known software tool that has already been described with reference to the prior art. This tool is used to create a layout for an integrated circuit.

In a known way, before the place and route tool is used, a set of cells are added to a netlist, this latter being a listing of the logic cells required to implement the functionality of the integrated circuit. More particularly, the netlist also provides the connectivity between cells in the netlist. For more detailed information, U.S. Pat. Nos. 5,880,967, 6,209,122, 6,711,719, 6,711,720, 6,687,888, and 6,327,552 are incorporated herein by reference.

At least one library of cells with a variable channel length is provided for creating a layout of the integrated circuit. The layout of the integrated circuit is created using the cells with an initial channel length L. More particularly, with reference to FIG. 1a, a High threshold voltage (HVT$_L$) 13 library is a circuit library including circuits comprising high VT (HVT$_L$) devices.

Once the layout is created, a timing analysis of the corresponding integrated circuit is executed in order to analyze more and less critical paths, by evaluating respective path delays. More particularly, a set of less critical paths are selected and the leakage currents of such less critical paths are evaluated. More particularly, for the timing analysis, a signoff static timing analysis (STA) 15 and 23 is used, including an integrated delay calculation engine that accurately models and computes the signal timing. STA tool 15 and 23 is able to analyze the most critical paths and highlight less critical ones with large margins on which it is possible to modify some cells after a careful evaluation of the corresponding leakage. For more detailed information, above described prior art literature concerning signoff static timing analysis is hereby included by reference.

According to embodiments of the present invention, on the basis of the corresponding evaluated leakage current and the respective path delays, the initial channel length L of the cells which are involved in the less critical paths of the selected set are modified. After the modification of the channel length L of the cells, a modified integrated circuit is obtained.

More particularly, an engineering change order (ECO) 20 is used to implement the changes directly in the layout of the integrated circuit. In the proposed flow the ECO 20 enables, on the basis of SIGNOFF STA results, to modify cells in non-critical paths in order to decrease their static power consumption on a completed placed and routed block. For more detailed information, above described prior art literature concerning Engineering change order is hereby included by reference.

With reference to FIG. 1a, the HVT$_L$ library 13 comprises high VT cells, which are characterized with parametric dependence from channel lengths L of the cells. In other words the library includes cells with a variable channel length that can be incremented in order to obtain a reduction in current leakage, corresponding to a reduction in timing performance, or decremented in order to obtain an improvement in timing performance, corresponding to an increased current leakage.

As it is well known, channel length is defined as the distance of the channel between the source and drain of a field-effect transistor (FET). As such, channel length L contrasts with the channel width which is the dimension of the channel that is orthogonal to the length and parallel to the source and drain.

With reference to FIG. 1a, upon initiation of the method 10, place & route tool 12 uses, in a known way, predefined timing libraries to obtain a completely routed block. The preferred implementation of the place & route tool 12 using the HVT$_L$ library 13 allows giving priority to the timing closure of the block.

Once the block has been completely routed, static timing analysis (STA) tool 15 is preferably activated to identify the set of less critical paths in the circuit. Normally lower frequency paths are considered as non-critical paths, having large timing margins. In such a way, a careful analysis of leakage 16 and path delay 17 is performed.

Based on this analysis, non-critical or less critical paths and respective circuit cells are selected to be modified. This step is indicated with reference number 18 in FIG. 1a and will be explained hereinafter.

The modification of the non-critical paths is preferably performed by means of the ECO method and design-step 20 which modify the variable channel length of the cells.

The algorithm to identify the cells to be modified and to choose how much to increase their variable channel length is based on the STA 15 result but could result in a very complex analysis that will not be described herein in more detail.

Just to give an example, each cell is usually belonging to several paths; depending on the criticality of each path, a "weight" could be assigned to each cell in the path thus resulting in a final decision on the single cell. If a cell is part of non-critical paths only, this can be decided to be doubled in L without problem.

Once the modification of the variable channel length of the cells belonging to the libraries is done, a modified integrated circuit is obtained and a check in terms of timing (step 23 in FIG. 1a) and leakage (step 24 in FIG. 1a) of the modified integrated circuit are performed. The designer just needs to check the output of the steps 23 and 24.

More particularly, a step of checking comprises an execution of the timing analysis on the modified integrated circuit, in order to further analyze more and less critical paths, by evaluating respective path delays. The respective path delays of the further more and less critical paths are compared with a respective path delays thresholds and a positive value is returned if the respective path delays are lower than the path delays thresholds.

If the step of checking returns the positive value, a further step for decreasing the leakage current of the modified integrated circuit may be executed on the modified integrated circuit.

More particularly, the further step for decreasing the leakage current includes a selection of a set of further less critical paths to be modified in the modified integrated circuit;

an evaluating of the leakage currents of such further less critical paths a modification of the variable channel length L of the cells which are involved in the further less critical paths of the selected set, on the basis of the corresponding evaluated leakage current and the respective path delays. A further modified integrated circuit is obtained.

According to embodiments of the invention, the step for decreasing the leakage current and the step for checking may be repeated until the leakage currents of the corresponding respective path delays in the modified integrated circuit are greater than a leakage current thresholds and/or the path delays of the further more and less critical paths are lower than the respective path delays thresholds.

In particular, on the basis of the selection of the further non-critical paths, an engineering change order (ECO step 20) is performed and the variable channel length of some other cells of the circuit is modified. Again, the selection of these further cells is performed on the basis of the parametric characterization of the cell depending on their channel length L.

These steps 15, 16, 17, 18, 20 are iteratively repeated until current leakages and timing margin of the analyzed path are considered safe to justify such a replacement.

It clearly appears that the method 10 according to FIG. 1a is primarily based on a preparation step of providing at least a HTV$_L$ library 13.

In particular, according to one embodiment of the invention, as above-mentioned, the library comprises high VT cells which are characterized with parametric dependence on channel lengths L of the cells. In other words the libraries include cells parametrically characterized with dependence from their channel length L.

The choice of libraries based on variable channel length has been developed starting from the following reasoning.

The leakage current depends on the threshold voltage and the channel length L according to the following relationship:

$$I_{leakage} \propto L^{-1} \exp(-qV_t/KT)$$

Contributions to the static power dissipation come from three main factors.

This expression shows that the static power dissipation, because of the exponential dependence on T, grows as the temperature increases. Besides, the smaller the channel length L, the greater the leakage current.

The other contribution is related to the switching threshold of the transistors, $V_t$. The smaller the threshold voltage is, the larger the leakage current.

This is the reason why, in latest technologies, a couple of subsets of cells, high $V_t$ (HVT) and low $V_t$ (LVT) are used.

Figure 2A:
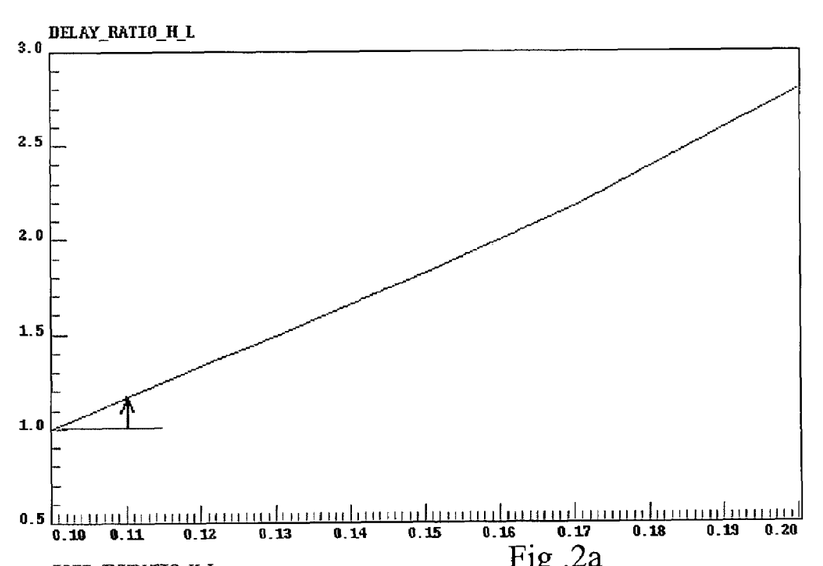
FIGS. 2a and 2b are diagrams illustrating the variation of path delay with respect to a variation of the channel length and the variation of Ioff of High-Vt inverter with respect of same variation of the channel length cited for FIG. 2a, respectively.

To confirm the above reasoning, a simulation has been performed to check the dependence relationship between current leakage and channel length L. The simulation results of a simple inverter chain are illustrated in FIG. 2a and in FIG. 2b In these charts, the x-axis corresponds to the channel length of the cells. In this case, the channel length of both n-mos and p-mos transistor has been reported.

Figure 2B:
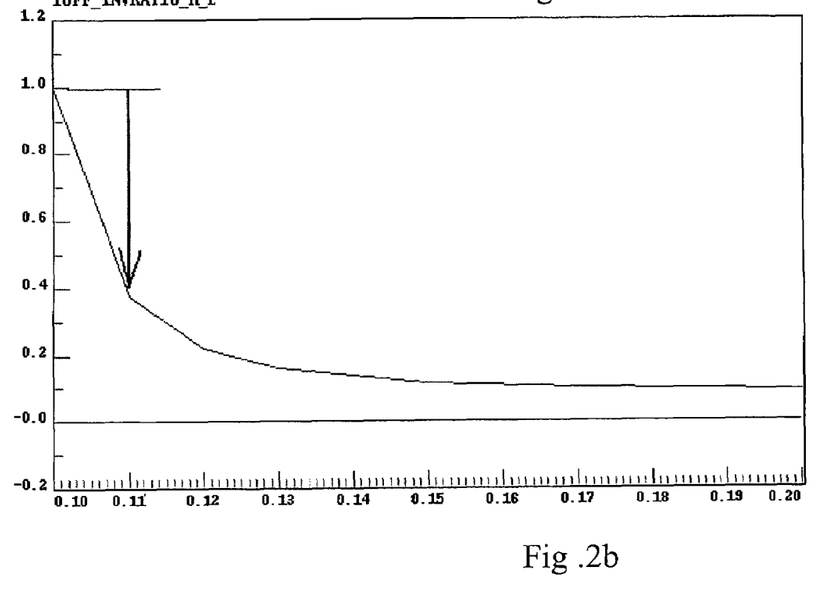
Figure 3:
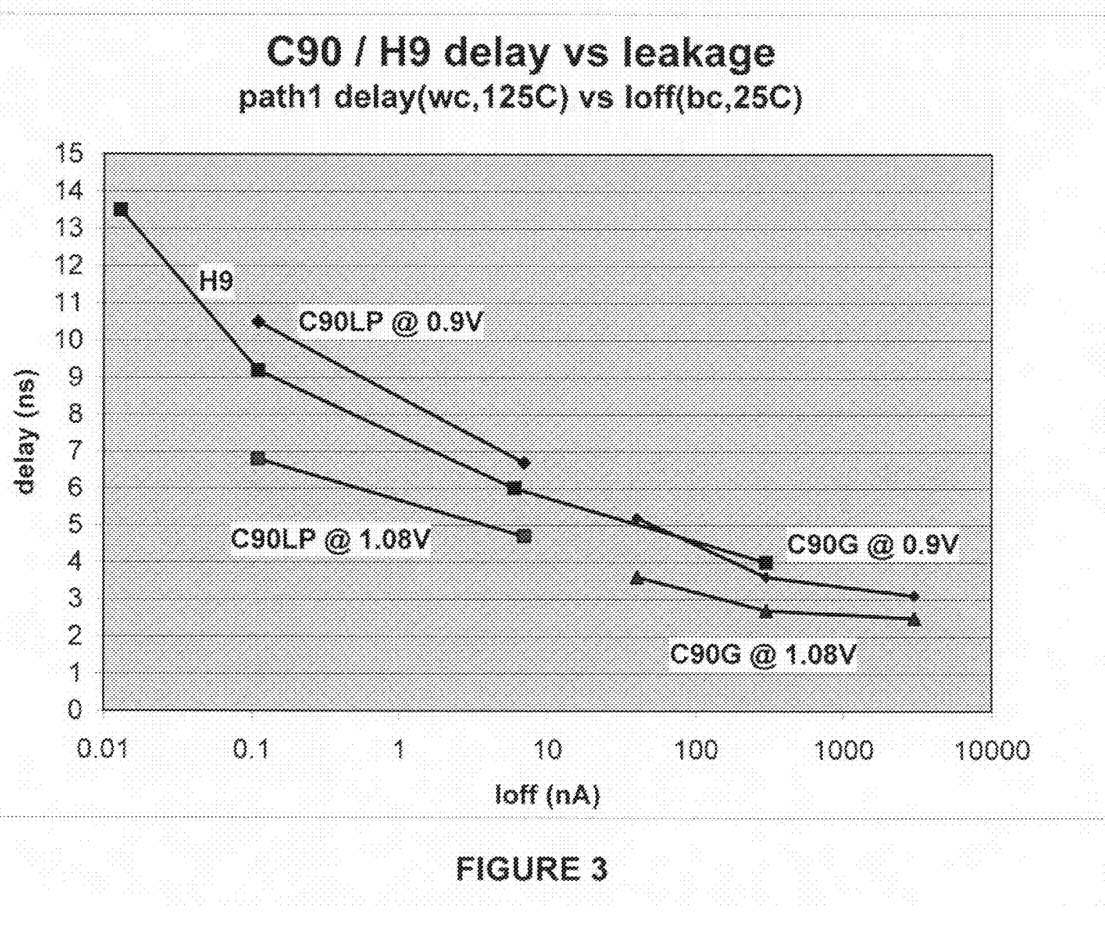
FIG. 3 is a chart illustrating the non-proportional dependency of path delay versus leakage.

In the y-axis of FIG. 2b it is reported the path delay of High-Vt inverter with respect to the minimum-channel length version (path delay reference value of 1.0 refers to the minimum channel length).

In the y-axis of FIG. 2b is represented Ioff of High-Vt inverter with respect to the minimum-channel length version (Ioff reference value of 1.0 refers to minimum channel length).

Those simulations have been performed by using an inverter chain formed by a cascade connection of standard inverters having a virtual load of some fF.

From this simulation it is clear that, by slightly increasing the channel length L, a great advantage in term of Ioff is achieved, with the only drawback of a small increase in propagation delay.

Starting from the above results of the simulation and the following technology report, a library of high-VT cells is built wherein the cells are modified on the basis of the channel length L, to be used in non-critical paths. From the above explanation, it can be derived that the parametric characterization of the cells can be accomplished in several ways.

According to one embodiment, a single timing library is built with parametric formula as a function of channel length. The timing library may also be built by providing a table of channel lengths including, for specific values of channel lengths, corresponding values of the leakage current and path delays. In this case, the length of the cells of the second library is selected by the table of channel lengths.

According to another embodiment of the invention, the step of building the parametric timing library is performed by building several timing libraries, each one based on a specific channel length L.

The simplest way to prepare the parametric layout (physical database) is to take advantage of the so-called "Pcell" (Parametric-Cell).

Starting from a basic layout, for example with minimum channel length L, a parameter is passed to a layout tool which is used to increase the channel length L by some units of grid values.

Figure 4:
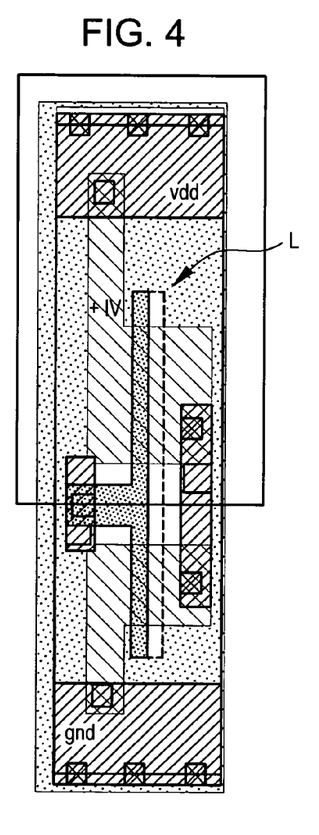
FIG. 4 illustrates a first layout of a basic inverter cell.
Figure 5:
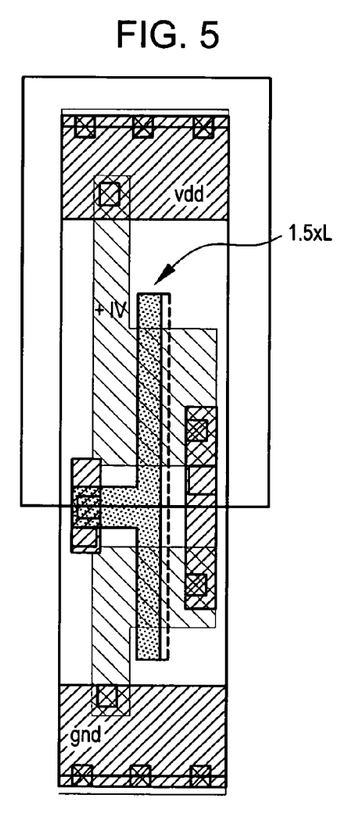
FIG. 5 illustrates a second layout of a modified inverter cell having a different channel length.
Figure 6:
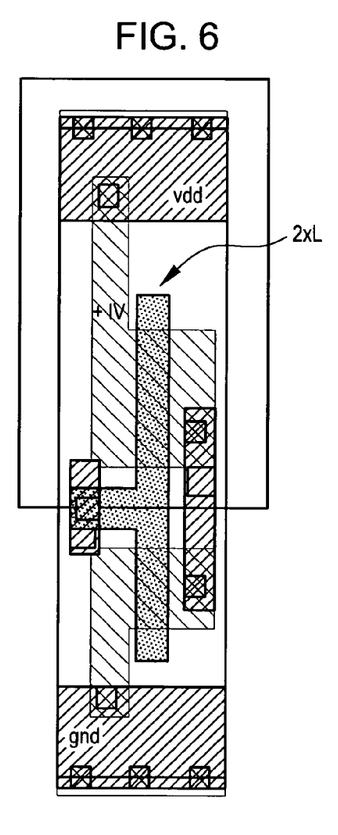
FIG. 6 illustrates a third layout of a modified inverter cell having a further different channel length.
Figure 7:
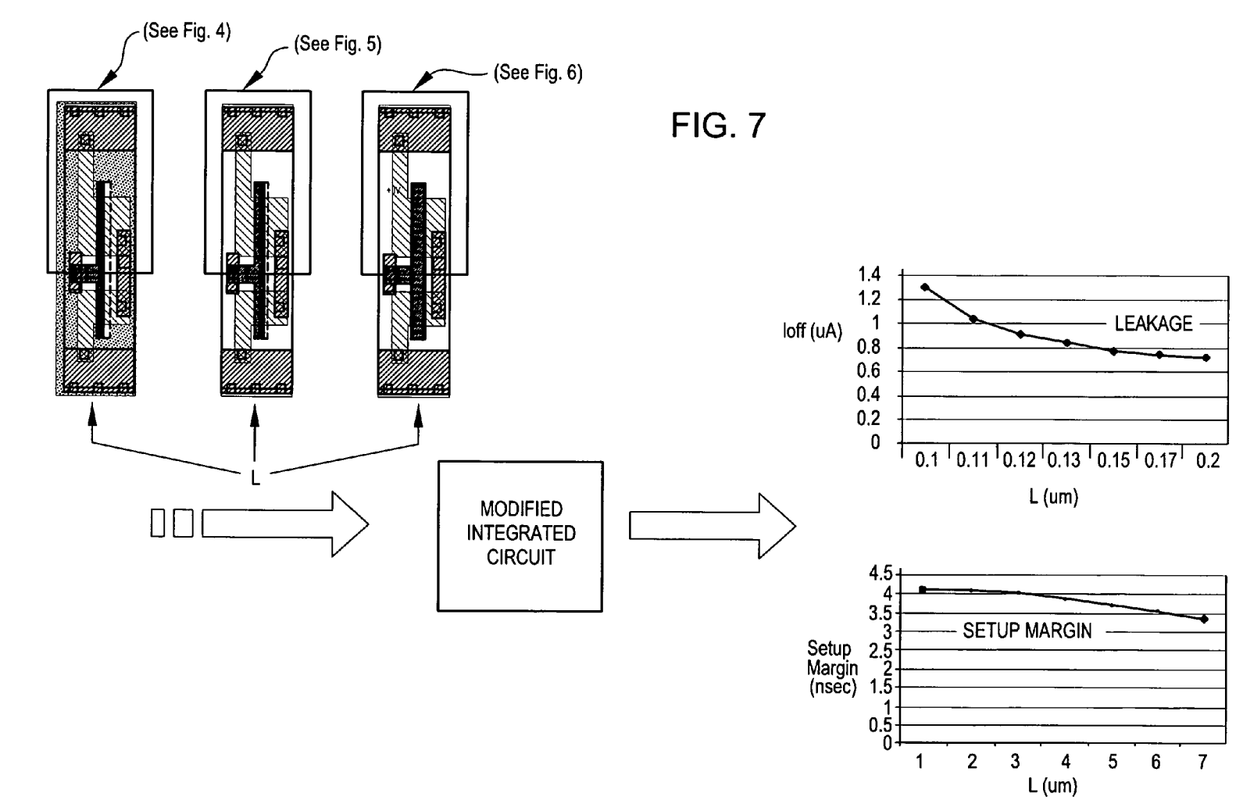
FIG. 7 is a schematic view of the results in terms of leakage current on channel lengths for a datapath built with both modified HVT and LVT cells as well as in terms of setup margin for critical paths in case of variation of channel lengths for both modified HVT and LVT cells.

For example, with reference to FIGS. 4 to 6, a set of modified inverter cells is proposed, which is based on a specified channel length Lmin, 1.5×Lmin, 2×Lmin. The channel length could span from minimum length Lmin to two times the minimum length 2×Lmin, for example.

This leads to a very simple way to achieve the target having designed the basic library only once for all different implementations and having a light database (no need of several libraries to be swapped).

More specifically, FIG. 4 illustrates a basic inverter cell, wherein dashed line is the room available to double the minimum channel length.

In FIG. 5, is illustrated a 3/2 Lmin modified Pcell (basic cell where the "xL" parameter=1.5).

In FIG. 6 is illustrated the 2×Lmin modified Pcell ("xL"=2).

The whole room available to double the channel length has been used.

Figure 1B:
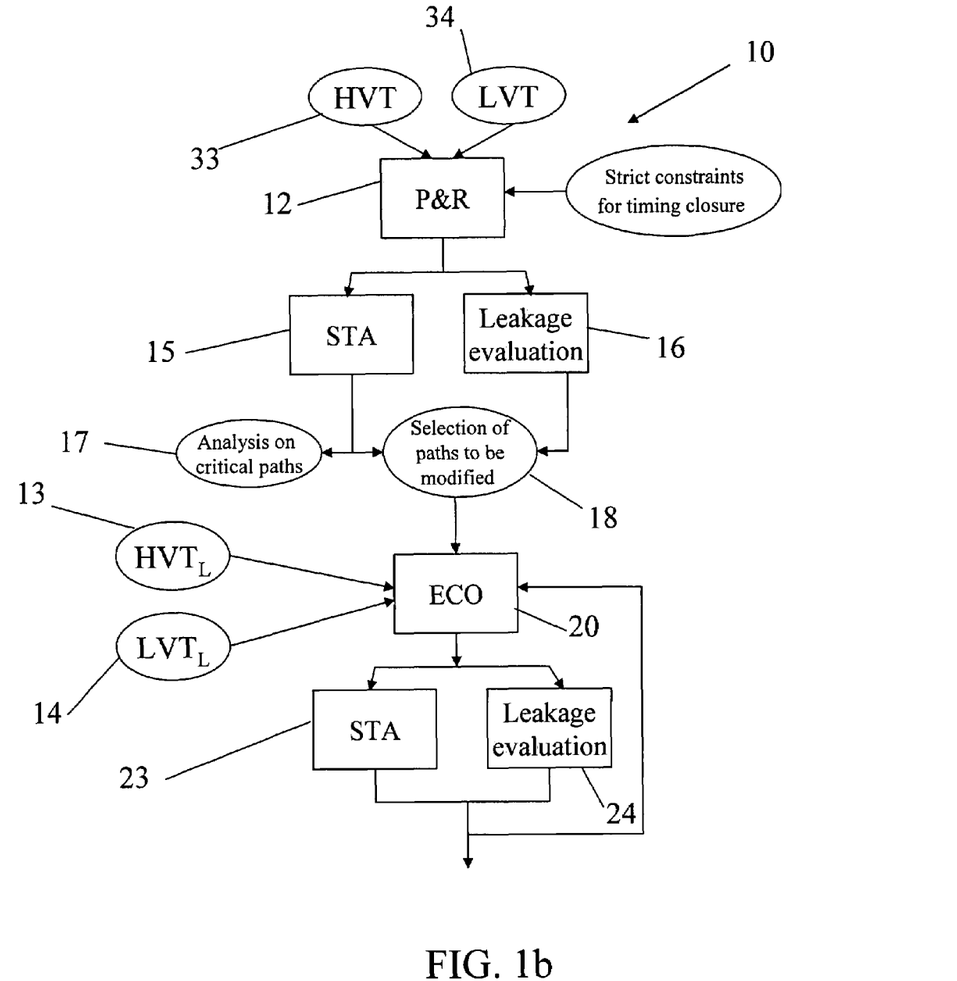
FIG. 1b is a flow chart of an implemented digital design flow according to another embodiment of the present invention.

With reference to FIG. 1b is hereafter described another embodiment of the present invention wherein the reduction of the leakage current in an integrated circuit is obtained by a substitution of cells.

The method includes the following steps of providing at least a first library of standard cells with a predetermined channel length; creating a layout of an integrated circuit using the standard cells of the first library; performing a timing analysis of the integrated circuit to analyze more and less critical paths by evaluating respective path delays; selecting a set of less critical paths to be modified; evaluating the leakage currents of the less critical paths of the selected set.

The method further includes providing a second library of cells with a variable channel length, having an initial length L; modifying the initial channel length L of the cells of the second library on the basis of the leakage current evaluated on the less critical paths and on the basis of the respective path delays, for reducing the leakage current in the cell of the second library; and replacing the standard cells of the first library which are involved in the less critical paths with cells of the second library, whereby a modified integrated circuit with reduced circuit leakage current is obtained.

As explained above, a place & route software tool 12 may be used to create a layout for the integrated circuit.

More particularly, with reference to FIG. 1b, a High threshold voltage (HVT) 33 library and a low threshold voltage (LVT) 34 library include circuits comprising low VT ($LVT_L$) cells or circuits comprising high VT ($HVT_L$) cells.

Once the layout is created, a signoff static timing analysis (STA) 15 and 23 technology is used, including an integrated delay calculation engine that accurately models and computes the signal timing.

An engineering change order (ECO) 20 is used to implement the changes directly in the layout of the integrated circuit. In the proposed flow the ECO 20 enables, on the basis of SIGNOFF STA results, to change standard cells in non-critical paths with cells of the second library, to decrease the static power consumption on a completed placed and routed block.

$LVT_L$ and $HVT_L$ libraries 13, 14 comprise low VT cells and high VT cells respectively, which are characterized with parametric dependence from channel lengths L of the cells.

Upon initiation of the method 10, place & route tool 12 uses, in a known way, predefined timing libraries to obtain a completely routed block. The preferred implementation of the place & route tool 12 using both LVT and HVT libraries 33, 34 allows priority to be given to the timing closure of the block.

Once the block has been completely routed, static timing analysis (STA) tool 15 is activated to identify the set of less critical paths in the circuit. Normally lower frequency paths are considered as non-critical paths, having large timing margins. In such a way, a careful analysis of leakage 16 and path delay 17 is performed.

Based on this analysis, non-critical or less critical paths and respective circuit cells are selected to be modified. This step is indicated with reference number 18 in FIG. 1*b*.

The modification of the non-critical paths may be performed by means of the ECO method and design-step 20 which changes the standard cells of a non critical path with cells of the second library having channel length L modified for reducing current leakage.

The algorithm to identify the standard cells to be replaced and to choose how much to increase the channel length L of the cell of the second library is for example based on the STA 15 result.

Once the modification of the channel length L of the cells belonging to the second library libraries is executed, a modified integrated circuit is obtained and a check in terms of timing (step 23 in FIG. 1*a*) and leakage (step 24 in FIG. 1*a*) of the modified integrated circuit are performed.

More particularly, the method includes a checking step for performing a timing analysis of the modified integrated circuit to analyze further more and less critical paths, by evaluating respective path delays; and comparing the respective path delays of the further more and less critical paths with a respective path delays thresholds.

The checking step returns a positive value if the path delays are lower than the path delays thresholds.

A further step for decreasing the leakage current may be executed if the checking step returns a positive value.

The further step for decreasing provides to select a set of further less critical paths to be modified; evaluate the leakage currents of the further less critical paths; and modify the variable channel length of the cells of the second library which are involved in the further less critical paths on the basis of the leakage current evaluated on the further less critical paths, whereby a modified integrated circuit is obtained.

The step for decreasing the leakage current and the step of checking are repeated until the leakage currents of the corresponding respective path delays in the modified integrated circuit are greater than a leakage current thresholds and/or the path delays of the further more and less critical paths are lower than the respective path delays thresholds.

According to a further embodiment of the present invention, a predefined library and a parametric library may be provided for reducing the current leakage by modifying the layout of the integrated circuit.

More particularly, according to such further embodiment, the method for designing a complex integrated electronic circuit architecture including a plurality of circuit portions integrated into a single chip structure by using a technique in order to reduce circuit leakage current, comprises the following steps of providing a predefined library of standard cells with a predetermined threshold voltage; building a parametric library by modifying the threshold voltage acting on the channel length L of said cells and building a timing characterization having parametric dependence on the cells channel length; creating a layout of an integrated circuit using the said standard cells of said predefined library; performing a first timing analysis of the integrated circuit to analyze more and less critical paths by evaluating respective path delays; evaluating the leakage currents of the circuit, and in particular those of the selected paths; selecting at least a set of less critical paths to be modified; based on the selected less critical paths to be modified, replacing the standard cells of said predefined library, which are involved in the less critical paths, with preselected parametric cells of said parametric library, the preselected parametric cells being selected on the basis of the timing characterization with parametric dependence from the cells channel length, whereby a modified integrated circuit is obtained; and performing a second timing and leakage analysis of the modified integrated circuit to check timing and leakage. Advantageously, according to the method of the present invention the leakage current of an integrated circuit may be reduced by creating the layout of the integrated circuit using cells with variable channel length, detecting a set of critical paths inside the integrated circuit and by modifying the channel length of the cells involved in such critical paths.

Advantageously, a single-threshold library of cells with variable channel length may be used for designing the integrated circuit or a multi-threshold library of cells with variable channel length may be adopted.

Advantageously, the reduction of current leakage is obtained using only the above cited single-threshold or multi-threshold library of cells and without introducing the complexity due to the use of additional libraries with non variable channel length.

Advantageously, the methods of embodiments of the present invention also provide the reduction of current leakage by substituting the cells of a first library, having a first predetermined channel length, with the cells of a second library, including cells with variable channel length.

Advantageously, embodiments of the present invention provides for repeating the steps for reducing the leakage current, increasing or decreasing steps by step the variable channel length L of the cells and checking the resulting path delays and leakage currents.

Embodiments of the present invention may be implemented using a variety of different types of electronic systems, such as computer systems including suitable processing circuitry, memory, and user input and output devices.

From the foregoing it will be appreciated that, although specific embodiments of the invention have been described herein for purposes of illustration, various modifications may be made without deviating from the spirit and scope of the invention.

The invention claimed is:

1. A method for designing a complex integrated electronic circuit architecture including a plurality of circuit portions integrated into a single chip structure, the method comprising the following steps of:
   a) providing, using a computer system, at least one library of cells, the cells in each library having associated variable channel lengths;
   b) creating a layout of an integrated circuit using the cells from at least one library, each cell having an initial channel length L;
   c) performing a timing analysis of the integrated circuit to analyze more and less critical paths by evaluating respective path delays;
   d) selecting a set of less critical paths to be modified;
   e) evaluating the leakage currents of the less critical paths of said selected set; and
   f) modifying the initial channel lengths L of at least some of the cells, each of the cells having its channel length modified being involved in at least one of said less critical paths of said selected set on the basis of the corresponding evaluated leakage current and the respective path delays, whereby a modified integrated circuit with a reduced circuit leakage current is obtained.

2. A method for designing a complex integrated electronic circuit architecture including a plurality of circuit portions integrated into a single chip structure, the method comprising:
   providing, using a computer system, at least one library of cells, the cells in each library having associated variable channel lengths;
   creating a layout of an integrated circuit using the cells from at least one library, each cell having an initial channel length L;
   performing a timing analysis of the integrated circuit to analyze more and less critical oaths by evaluating respective oath delays:
   selecting a set of less critical paths to be modified;
   evaluating the leakage currents of the less critical paths of said selected set;
   modifying the initial channel lengths L of at least some of the cells, each of the cells havinci its channel length modified being involved in at least one of said less critical paths of said selected set on the basis of the corresponding evaluated leakage current and the respective path delays, wherein a modified integrated circuit with a reduced circuit leakage current is obtained; and
   wherein the method further includes a checking step, comprising:
      performing said timing analysis on said modified integrated circuit to analyze further more and less critical paths, by evaluating respective path delays;
      comparing said respective path delays of said further more and less critical paths with a respective path delays threshold; and
      returning a positive value if said respective path delays are lower than said path delays thresholds.

3. The method according to claim 2, comprising a further step for decreasing the leakage current of the modified integrated circuit that is executed if said returning step returns said positive value.

4. The method according to claim 3, wherein said further step for decreasing the leakage current includes an execution of said steps d), e) and f) on said further less critical paths for obtaining a further modified integrated circuit.

5. The method according to claim 4, wherein said step for decreasing the leakage current and said checking step are repeated until the leakage currents of the corresponding respective path delays in the modified integrated circuit are greater than a leakage current threshold and/or the path delays of said further more and less critical paths are lower than the respective path delays thresholds.

6. The method according to claim 1, wherein said step of creating the layout is performed by means of a place and route software tool.

7. The method according to claim 1, wherein said step of timing analysis is performed by means of respective signoff static timing analysis tool.

8. The method of claim 1, wherein the operation of modifying the initial channel lengths L of at least some of the cells comprises for each cell:
   determining whether the cell belongs to more than one path;
   assigning a weight value to the cell, the weight value having a value that is a function of the criticality of each path containing the cell; and
   modifying the initial channel length of the cell on the basis of the assigned weight value.

9. A method for designing a complex integrated electronic circuit architecture including a plurality of circuit portions integrated into a single chip structure, the method comprising the following steps of:
   a1) providing, using a computer system, at least a first library of standard cells with a predetermined channel length;
   b1) creating a layout of an integrated circuit using said standard cells of said first library;
   c1) performing a timing analysis of the integrated circuit to analyze more and less critical paths by evaluating respective path delays;
   d1) selecting a set of less critical paths to be modified;
   e1) evaluating the leakage currents of the less critical paths of said selected set;
   f1) providing a second library of cells with a variable channel length, each of the cells of the second library having an initial channel length L;
   g1) modifying the initial channel length L of said cells of said second library on the basis of the leakage current evaluated on said less critical paths and on the basis of the respective path delays, for reducing the leakage current in the cell of said second library; and
   h1) replacing the standard cells of said first library which are involved in said less critical paths with cells of said second library, whereby a modified integrated circuit with reduced circuit leakage current is obtained.

10. The method according to claim 9, further comprising a checking step including:
   performing a timing analysis of the modified integrated circuit to analyze further more and less critical paths, by evaluating respective path delays;
   comparing said respective path delays of said further more and less critical paths with a respective path delays threshold; and
   returning a positive value if said respective path delays are lower than said path delay threshold.

11. The method according to claim 10, comprising a further step for decreasing the leakage current including;
   selecting a set of further less critical paths to be modified;
   evaluating the leakage currents of the further less critical paths; and
   modifying the variable channel length of said cells of said second library which are involved in said further less critical paths on the basis of the leakage current evaluated on said further less critical paths, whereby a modified integrated circuit is obtained.

12. The method according to claim 11, wherein said step for decreasing the leakage current and said step of checking are repeated until the leakage currents of the corresponding respective path delays in the modified integrated circuit are greater than the leakage current threshold and/or the path delays of said further more and less critical paths are lower than the respective path delays threshold.

13. The method according to claim 9, wherein said first library comprises both a high threshold voltage cell library and a low threshold voltage cell library in order to give priority of the timing closure of the block.

14. The method according to claim 9, wherein said step of providing the second library is performed by building a timing library with parametric formulas as a function of channel length.

15. The method according to claim 14, wherein said step of providing the second library is performed by building a timing library comprising a table of channel lengths including, for specific values of channel lengths, corresponding values of the leakage current and the respective path delays, the length of said cells of said second library being selected by the table of channel lengths.

16. The method according to claim 14, wherein providing the parametric library is performed by building several timing libraries, each one based on a specific channel length.

17. The method according to claim 9, wherein a set of standard cells is built-up based on the needed channel lengths, from minimum length to a higher length.

18. The method according to claim 17, wherein said higher length is at least two times the minimum length.

19. The method according to claim 18, wherein starting from a basic layout with minimum channel length, a parameter is passed to a layout tool which is used to increase the channel length by some units of grid values.

* * * * *

UNITED STATES PATENT AND TRADEMARK OFFICE
CERTIFICATE OF CORRECTION

| | | |
|---|---|---|
| PATENT NO. | : 7,716,618 B2 | Page 1 of 1 |
| APPLICATION NO. | : 11/809783 | |
| DATED | : May 11, 2010 | |
| INVENTOR(S) | : Lina Ferrari and Francesco Cretti | |

It is certified that error appears in the above-identified patent and that said Letters Patent is hereby corrected as shown below:

- In Claim 2, Column 11, Line 15 of the patent, "respective oath delays:" should read --respective path delays:--.

- In Claim 2, Column 11, Line 20 of the patent, "the cells, each of the cells havinci its channel length" should read --the cells, each of the cells having channel length--.

Signed and Sealed this
First Day of May, 2012

David J. Kappos
*Director of the United States Patent and Trademark Office*